United States Patent
Bannai et al.

(10) Patent No.: US 7,880,760 B2
(45) Date of Patent: *Feb. 1, 2011

(54) OPTICAL WRITING DEVICE AND IMAGE FORMING APPARATUS

(75) Inventors: Kazunori Bannai, Kanagawa-Ken (JP); Daisuke Imaki, Kanagawa-Ken (JP)

(73) Assignee: Ricoh Company, Ltd., Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 12/396,140

(22) Filed: Mar. 2, 2009

(65) Prior Publication Data

US 2009/0220276 A1    Sep. 3, 2009

(30) Foreign Application Priority Data

Feb. 29, 2008   (JP) .............................. 2008-049961

(51) Int. Cl.
- *B41J 2/435* (2006.01)
- *B41J 2/47* (2006.01)
- *G02B 26/10* (2006.01)

(52) U.S. Cl. ....................... 347/245; 347/232; 347/243; 347/244

(58) Field of Classification Search ........................ None
See application file for complete search history.

(56) References Cited

U.S. PATENT DOCUMENTS

| | | | |
|---|---|---|---|
| 5,055,860 A | 10/1991 | Bannai | |
| 5,315,322 A | 5/1994 | Bannai | |
| 5,691,761 A * | 11/1997 | Fisli | ............................ 347/241 |
| 6,697,092 B2 | 2/2004 | Bannai | |
| 6,786,590 B2 | 9/2004 | Maki et al. | |
| 6,873,346 B2 | 3/2005 | Bannai | |
| 6,891,559 B1 | 5/2005 | Bannai | |
| 7,079,171 B2 * | 7/2006 | Sung et al. | .................. 347/241 |
| 7,215,349 B2 | 5/2007 | Sakaue et al. | |
| 7,436,425 B2 * | 10/2008 | Yamazaki et al. | ........... 347/244 |
| 7,705,872 B2 * | 4/2010 | Higaki et al. | ............... 347/243 |
| 2004/0100550 A1 | 5/2004 | Bannai et al. | |
| 2007/0053040 A1 | 3/2007 | Sakaue et al. | |
| 2007/0064087 A1 | 3/2007 | Matsumae et al. | |
| 2007/0153079 A1 | 7/2007 | Sakaue et al. | |

(Continued)

FOREIGN PATENT DOCUMENTS

JP            4-74688          3/1992

(Continued)

*Primary Examiner*—Omar Rojas
(74) *Attorney, Agent, or Firm*—Dickstein Shapiro LLP (57) ABSTRACT

A first beam separation device is arranged either to allow the light beams to enter and pass or to reflect the light beams in accordance with a direction of entrance of the light beams. A second beam separation device is provided either to allow or to reflect the light beams having passed through the first beam separation device in accordance a wavelength thereof. The light beam passing through the second beam separation device scans one of plural scan objectives and the light beam reflected by the second beam separation device is further reflected by the first beam separation device and then scans the other one of the plural scan objectives. A first imaging device is provided to correct a f-theta (fθ) performance and a curvature of an imaging plane to enable the light beams to scan the plural scan objectives at a constant speed. The first imaging device is integral with the first beam separation device.

10 Claims, 8 Drawing Sheets

U.S. PATENT DOCUMENTS

2007/0188589 A1 8/2007 Kusunose et al.
2008/0024851 A1 1/2008 Sakaue et al.
2009/0066780 A1* 3/2009 Bannai et al. ............... 347/239

FOREIGN PATENT DOCUMENTS

| JP | 9-127444 | 5/1997 |
|----|----------|--------|
| JP | 10-3048 | 1/1998 |
| JP | 10-282440 | 10/1998 |
| JP | 3084829 | 7/2000 |

* cited by examiner

OPTICAL WRITING DEVICE AND IMAGE FORMING APPARATUS

CROSS REFERENCE TO RELATED APPLICATION

This application claims priority under 35 USC §119 to Japanese Patent Application No. 2008-049961, filed on Feb. 29, 2008, the entire contents of which are herein incorporated by reference.

BACKGROUND OF THE INVENTION

1. Field of the Invention

The present invention relates to an optical writing device employed in an image forming apparatus, such as a copier, a printer, a facsimile, etc.

2. Discussion of the Background Art

Recently, an image forming apparatus is demanded to be compact and light at low cost. In particular, since having many parts, a color image forming apparatus is significantly large in comparison with a conventional monochrome image forming apparatus, thereby being highly expected to be compact.

Figure 12:
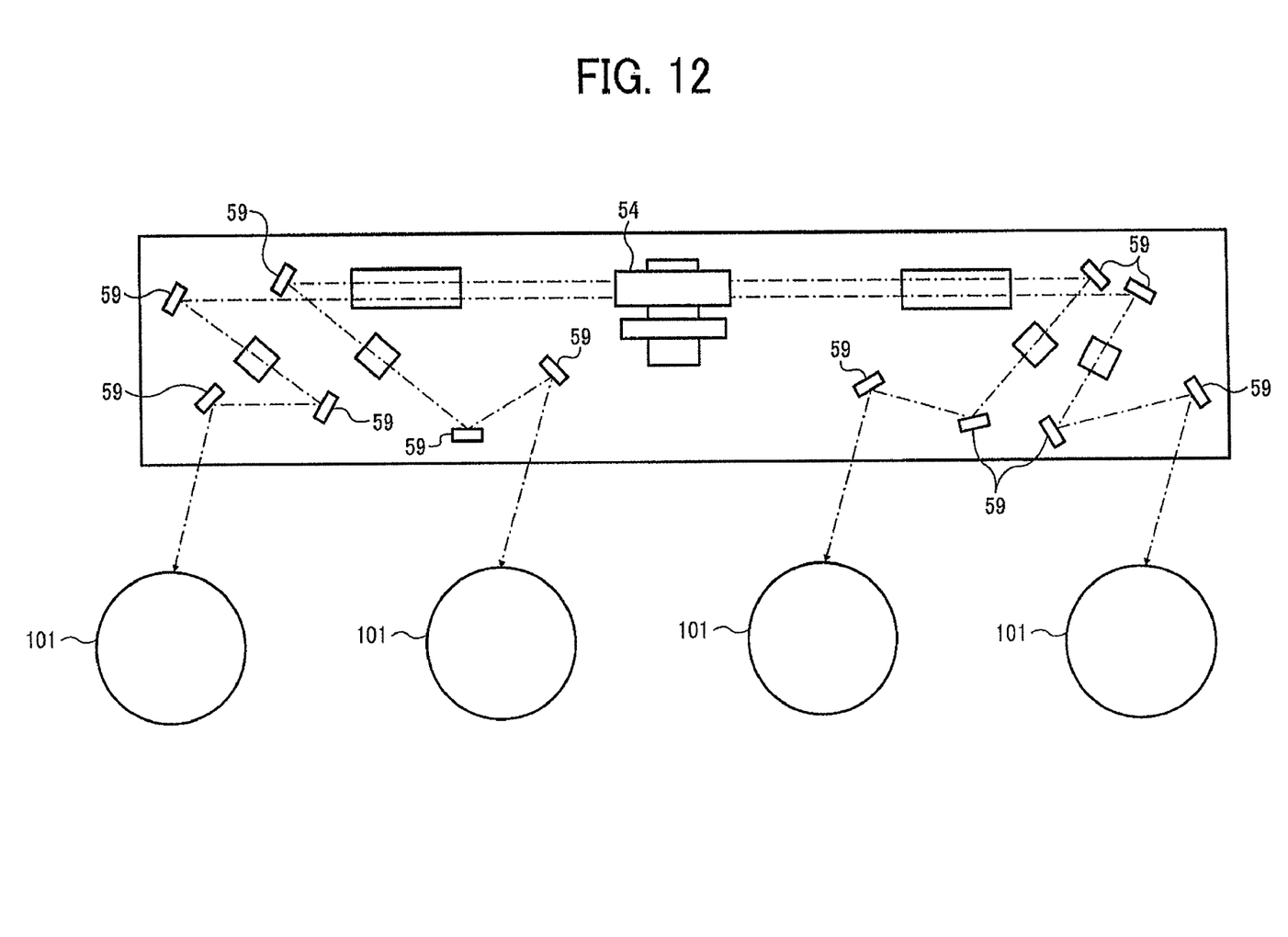
FIG. 12 illustrates a conventional optical writing device.

An optical writing device (i.e., an optical scanning device) employed in a commercially available image forming apparatus emits plural light beams to a scan receiving surfaces on image carriers by folding plural times using plural reflection mirrors. However, since using the plural mirrors, the optical writing device tends to be thick as shown in FIG. 12.

As shown, a light beam emitted from a light source, not shown, is finally led to a photoconductive member 101 as a scanning objective via plural mirrors 59 after being deflected by a polygon mirror 54. Since the mirrors 59 need to be arranged not to interfere with each other, a large space is needed, and accordingly, the optical writing device necessarily becomes taller.

The Japanese Patent Application Laid Open No. 58-79215 describes a laser printer use optical system enabling twin color printing in black and red. The Japanese Patent Application Laid Open No. 9-127444 describes a multi beam scanning apparatus capable of increasing accuracy of color supervision while improving workability of maintenance.

The Japanese Patent Application Laid Open No. 10-3048 describes a multi color image forming apparatus for scanning plural photoconductive members using two light sources of a different deflecting direction or a different wavelength. The Japanese Patent Application Laid Open No. 10-282440 describes an optical scanning apparatus and an electro-photographic recording apparatus each employs a multi chip semiconductor laser light source including plural semiconductor laser chips arranged side by side having a different light generation wavelength and distributes and emits laser beams to plural photoconductive member drums.

The Japanese Patent No. 3084829 describes an image forming apparatus for forming an image by deflecting and separating plural laser beams and then emitting those to different sections.

However, since the combined light beam is separated by the separating device in the above-mentioned prior arts, a length of a light path up to the photoconductive member is different from others, or a polygon mirror scanning plane is not in parallel to that extending over light emission receiving positions of the photoconductive members when the light path length is adjusted, as shown in the Japanese Patent Application Laid Open Nos. 58-79215, and 9-127444 as well as the Japanese Patent No. 3084829. Further, an entrance angle of a light beam into the photoconductive member is different from others.

When the plane connecting a polygon mirror scan surface with a light emission position on the photoconductive member is not in parallel to others, the image forming apparatus cannot be downsized admitting that only the optical writing device is downsized due to employment of the plural mirrors. Further, when optical elements for forming a four-color image are substantially symmetrically arranged regarding a polygon mirror serving as a center, the photoconductive members are hardly aligned on a straight line, and are difficult to be applied to a tandem type color image forming apparatus currently spreading widely.

Further, since the optical path length up to the photoconductive member and the entrance angle of the light beam into the photoconductive member are different from others as in the Japanese Patent Application Laid Open Nos. 10-3048 and 10-282440, a diameter of a light beam becomes different on a scan receiving surface of the photoconductive member from others and causes some disadvantages to multi color superimposition on the photoconductive member.

SUMMARY OF THE INVENTION

The present invention has been made in view of the above noted and another problems and one object of the present invention is to provide a new and noble optical writing device. Such a new and noble optical writing device includes plural optical elements and a light deflection device that deflects the light beams from the plural light sources in a sub scanning direction for scanning plural scan objectives. Plural light sources emit light beams having a different wavelength from each other. A first beam separation device is arranged to receive the light beams and either allows the light beams to enter and pass or reflects the light beams in accordance with a direction of entrance of the light beams. A second beam separation device is provided either to allow or to reflect the light beams having passed through the first beam separation device in accordance a wavelength thereof. The light beam passing through the second beam separation device scans one of the plural scan objectives and the light beam reflected by the second beam separation device is further reflected by the first beam separation device and then scans the other one of the plural scan objectives. A first imaging device is provided to correct a f-theta (fθ) performance and a curvature of an imaging plane to enable the light beams to scan the plural scan objectives at a constant speed. The first imaging device is integral with the first beam separation device.

In another embodiment, the first imaging device includes an optical performance of narrowing the light beam into a prescribed shape on the at least two scan objectives.

In yet another embodiment, a second imaging device is integral with the second beam separation device and narrows the light beams in the sub scanning direction on the plural scan objectives. The first imaging device includes an optical performance of narrowing the light beams into a prescribed shape in a main scanning direction on the other one of the plural scan objectives.

In yet another embodiment, the first imaging device is provided on a beam entrance surface of the first beam separation device.

In yet another embodiment, one of the first and second imaging devices includes an anamorphic lens.

In yet another embodiment, one of the first and second imaging devices includes a diffractive optical element.

In yet another embodiment, the second imaging device is made of transparency resin and includes a dielectric conductive multi layer on the beam entrance surface.

In yet another embodiment, the optical elements other then the light deflecting device are substantially symmetrically arranged on both sides of the light deflecting device commonly used, and the plural light sources include four light sources for different mono colors and the plural scan objectives include four scan objectives which receive four light beams emitted from the four light sources, respectively.

In yet another embodiment, a full color image formation device apparatus includes the optical writing device and the plural scan objectives are arranged in tandem.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein.

PREFERRED EMBODIMENTS OF THE PRESENT INVENTION

Figure 1:
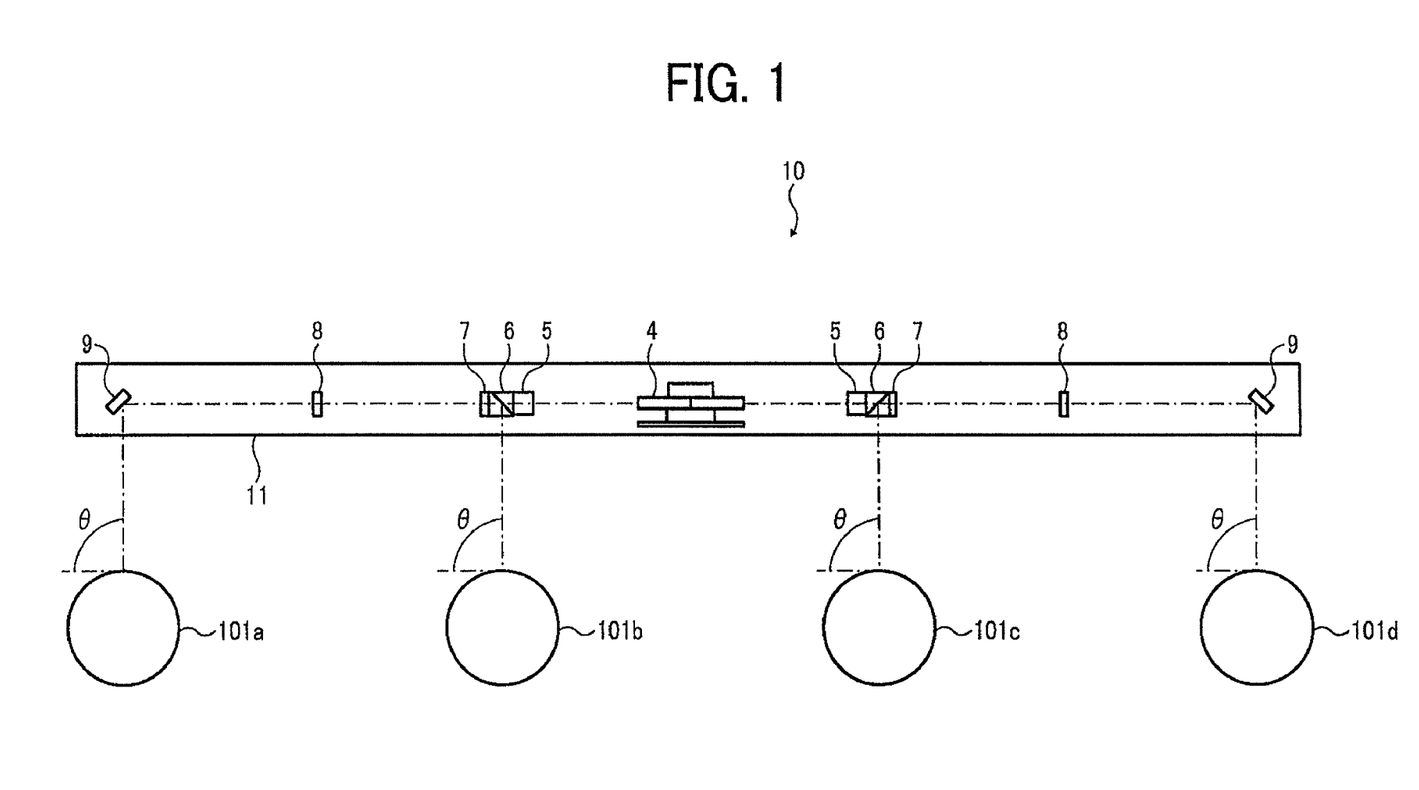
FIG. 1 is a cross sectional view illustrating a principal part of an exemplary optical writing device according to one embodiment of the present invention.
Figure 2:
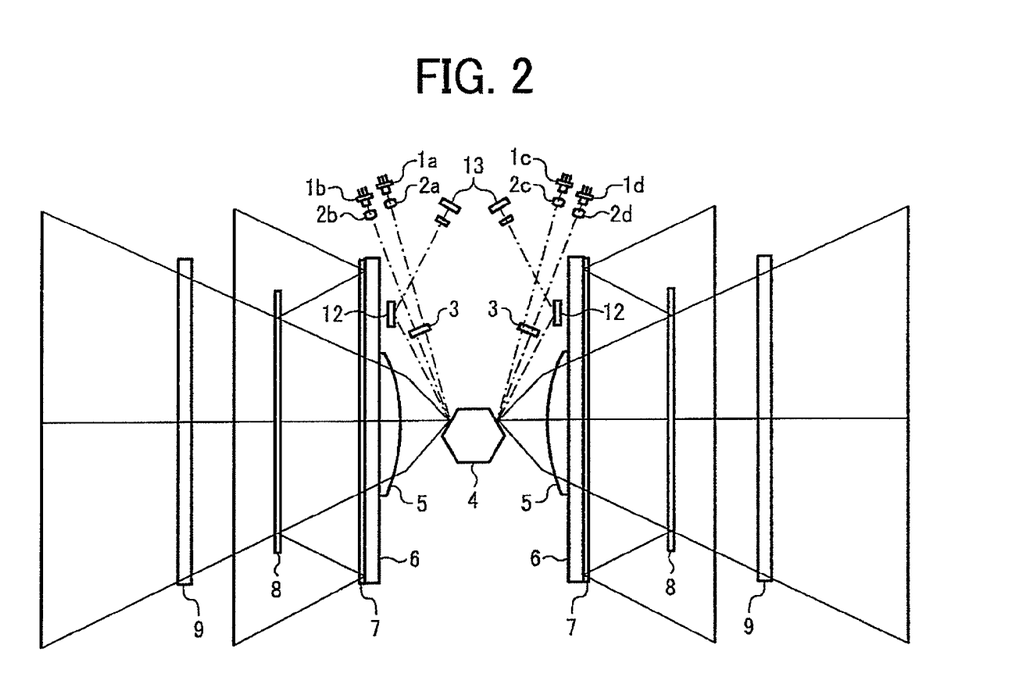
FIG. 2 is a plan view illustrating the principal part of an exemplary optical writing device of FIG. 1.

Referring now to the drawings, wherein like reference numerals and marks designate identical or corresponding parts throughout several figures, in particular in FIGS. 1 and 2, an optical writing device 10 includes a commonly used polygon mirror 4 serving as a deflecting device and two sets of optical elements substantially symmetrically arranged on both sides of the polygon mirror 4 that scans four photoconductive members.

As shown the optical writing device 10 includes plural semiconductor lasers 1a to 1d, plural collimate lenses 2a to 2d, a cylindrical lens 3, a polygon mirror 4, a scanning lens 5 as a first imaging device, a polarization light beam splitter 6 as a first beam separation device, a quarter wavelength plate 7, a dichroic mirror 8 as a second beam separation device, and a reflection mirror 9 and the like. These components are arranged within a unit casing 11.

The scanning lens 5 is integrally attached to the polarization light beam splitter 6 and is largely distanced from the polygon mirror 4, so that an enough space is created to allow a light beam to enter the polygon mirror 4. As a result, plural photoconductive members are arranged at a narrow interval can be handled without a problem. The scanning lens 5 includes an optical performance of correcting f-theta performance and an image plane curvature so that the light beam sans a scan-receiving surface at a constant speed.

The semiconductor lasers 1a and 1b emit light beams having a different wavelength band each handled by the dichroic mirror 8 serving as an optical separation device. Similarly, the semiconductor lasers 1c and 1d emit light beams having a different wavelength band each handled by the dichroic mirror 8.

Since the plural sets of optical elements arranged on both sides of the polygon mirror operate in the same way, an operation of scanning with the semiconductor lasers 1a and 1b on the left are typically described.

The light beams with the different wavelengths emitted from the semiconductor lasers 1a and 1b are combined on the same axis in the sub scanning direction via the collimate lenses 2a and 2b as well as a cylindrical lens. The light beams are then reflected by the polygon mirror and passes through the scanning lens and the polarization light beam splitter 6. The polarization beam splitter 6 separates a light beam in accordance with a difference of a rotational angle of 90 degree ($\pi/2$) of a polarization direction, so that the light beam either passes through or is reflected in accordance with an entrance direction of the light beam.

The two light beams launched from the scanning lens 5 and passing through the polarization beam splitter 6 passes through a quarter (¼) wavelength plate 7 that rotates a polarization direction of the light beam by the angle of 45 degree ($\pi/4$). Thus, one of the two light beams then passes and the other is reflected by the dichroic mirror 8 arranged perpendicular to the light beam with each being rotated by the angle of 45 degree ($\pi/4$) from the time when respective lights are emitted. At that time, the dichroic mirror 8 may include a multilayer coat dielectric mirror. The dichroic mirror 8 allows a light beam having a prescribed wavelength band to pass and reflects a light beam having another wavelength band. Specifically, these two beams are separated into reflection and transmission lights by the dichroic mirror 8.

The light beam passing through the dichroic mirror 8 is reflected by the reflection mirror 9 and arrives at the scan-receiving surface on the photoconductive member 101a. On the other hand, the light beams reflected by the dichroic mirror 8 returns along the same path and passes through the quarter wavelength plate 7 again and is rotated by the angle of 45 degree ($\pi/4$), totally 90 degree from the time of light emission and enters the polarization beam splitter 6. The light beam rotated by the angle of 45 degree ($\pi/4$) is then reflected by the polarization beam splitter 6 and is emitted to the scan receiving surface of the photoconductive member 101b. In this way, the light beams emitted from the semiconductor lasers 1a and 1b are led and scan the photoconductive members 101a and 101b, respectively.

In this embodiment, these two light beams emitted from the semiconductor lasers 1a and 1b include P-waves of a straight-line polarization light, for example. Thus, one of the light beams passes through the dichroic mirror 8 and is emitted to the photoconductive member 101a being rotated by the quarter wavelength plate 7 by the angle of 45 degree (π/4) to be a circular polarization light. The other one of the two light beams is reflected by the dichroic mirror 8 and passes through the quarter wavelength plate 7 again after being rotated by the quarter wavelength plate 7 by the angle of 45 degree (π/4) and then becoming a circle shape polarization light. Thus, the polarization direction of the other beam is further rotated by the angle of 45 degree and is emitted to the photoconductive member 101b in a state of a S-wave of a straight-line polarization light.

On the right side of the polygon mirror 4, two beams emitted from the semiconductor lasers 1c and 1d are similarly led and scan the photoconductive members 101c and 101d.

In this embodiment, a length of a light path from each of the semiconductor lasers 1a to 1d to the photoconductive members 101a to 101d is the same with each other.

Further, an entrance angle of each of the light beams is the same as others as indicated by an angle of theta (θ). A scanning plane, on which the polygon mirror executes scanning, is arranged substantially in parallel to a plane that includes rotational axes of the plural photoconductive members 101a to 101d.

Figure 3:
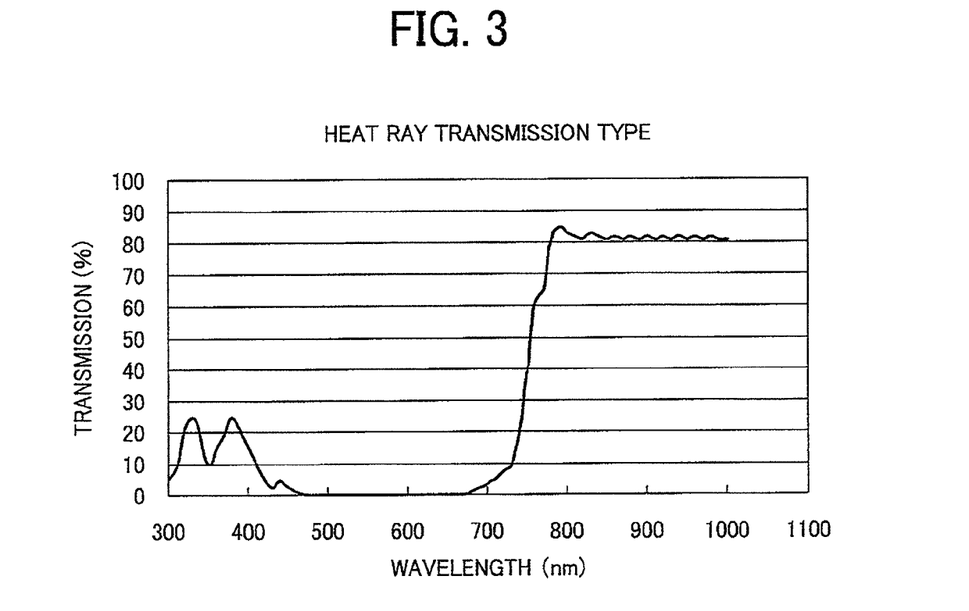
FIG. 3 illustrates an exemplary relation between a wavelength and a magnetic permeability of a transmittance of a heat ray transmission type dichroic mirror.
Figure 4:
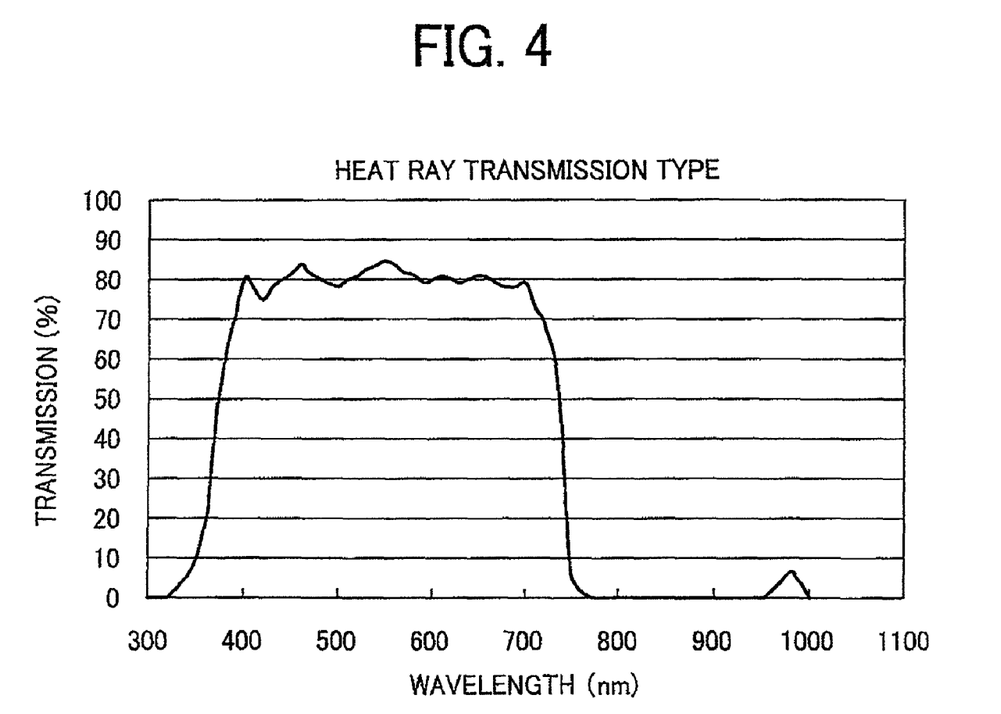
FIG. 4 also illustrates an exemplary relation between a wavelength and a magnetic permeability of a transmittance of a heat ray reflection type dichroic mirror.

In order to separate two light beams using the dichroic mirror 8, wavelengths of these light beams need to be different from the other. A boarder between reflection and transmission depends on a multi layer coat to be added. When a dichroic mirror is used having a relation between a wavelength and a transmission rate as shown in FIGS. 3 and 4, the boarder is in the vicinity of the wavelength of 750 nanometer. Thus, the above-mentioned wavelength band in the vicinity of the boarder needs to be chosen for a light beam to be used. Thus, when the dichroic mirror is used having the relation as shown in FIGS. 3 and 4, a visible light having a wavelength of about 650 nm and an infrared light having a wavelength of about 800 nm can be chosen. Thus, the semiconductor lasers 1a and 1b can employ such visible and infrared lights, respectively.

A hot mirror (i.e., a heat ray reflection type) and a cold mirror (i.e., a heat ray transmission type) are exemplified as the dichroic mirror, and can selectively be employed in this embodiment of the present invention.

Figure 10:
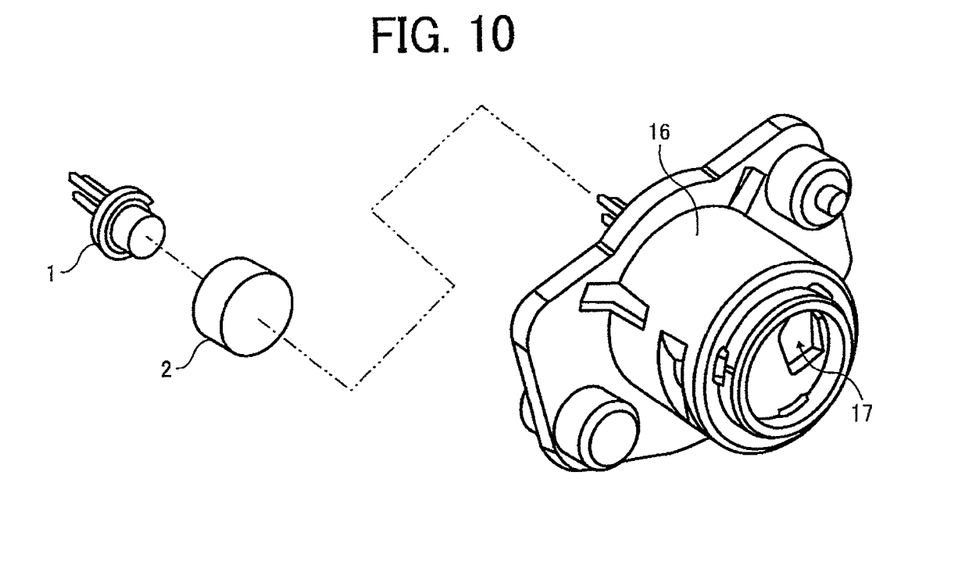
FIG. 10 is a perspective view illustrating a specific example arrangement of a laser diode and a collimate lens provided in a lens holder according to one embodiment of the present invention.

Now, synchronization detection executed in the optical writing device 10 is described with reference to FIG. 10. Plural semiconductor y lasers 1c and 1d of the left side on the polygon mirror are typically described, because plural semiconductor lasers 1c and 1d on the right side thereof are the same.

As shown in FIG. 2, light beams emitted from the semiconductor lasers 1a and 1b are reflected by the polygon mirror 4 and are received by synchronization detection elements 13 via a reflection mirror 12 arranged on the outside of the scanning range. Since the synchronization detection element 13 is arranged before the light beam enters the polarization beam splitter 6, synchronization detection is commonly executed by only one element for the two light sources. Further, in such a configuration, since angles of the semiconductor lasers 1a and 1b in relation to the polygon mirror 4 are different from each other, and these two light sources are deviated in the main scanning direction, these two light beams do not enter the synchronization detection element 13 at the same time. As a result, light generation times of the semiconductor lasers 1a and 1b need not to be controlled. It is the same in the semiconductor lasers 1c and 1d.

As mentioned above, according to this embodiment, two beams combined on the same axis in the sub scanning direction can be separated by the first and second beam separation devices, and can be led to the photoconductive members of the scanning objective without arranging plural reflection mirrors at the different up and down positions as in the conventional apparatus as illustrated in FIG. 12. Further, since the lens 14 is arranged as a second imaging device at a position after the light beam is reflected by the reflection mirror 9 and the polarization light beam splitter 6, the optical writing device can be slimed.

The optical writing device 10 of this embodiment can preferably be employed in a tandem type full color image forming apparatus avoiding increase of a thickness even when four light beams are distributed to four photoconductive members. Thus, the above-mentioned structure effectively downsizes the full color image forming apparatus especially avoiding increase of height.

Figure 5:
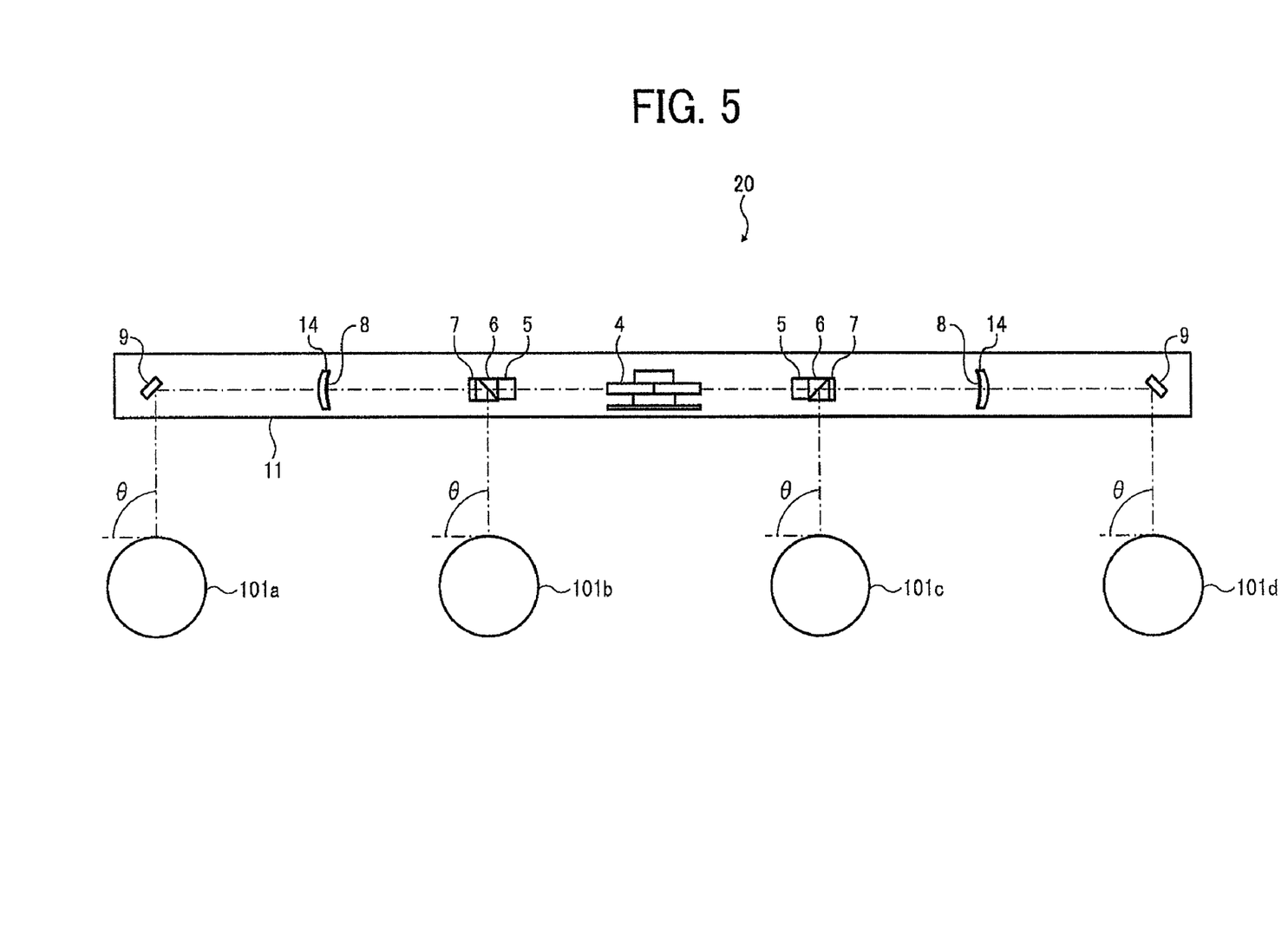
FIG. 5 illustrates an exemplary optical writing device according to a second embodiment of the present invention.
Figure 6:
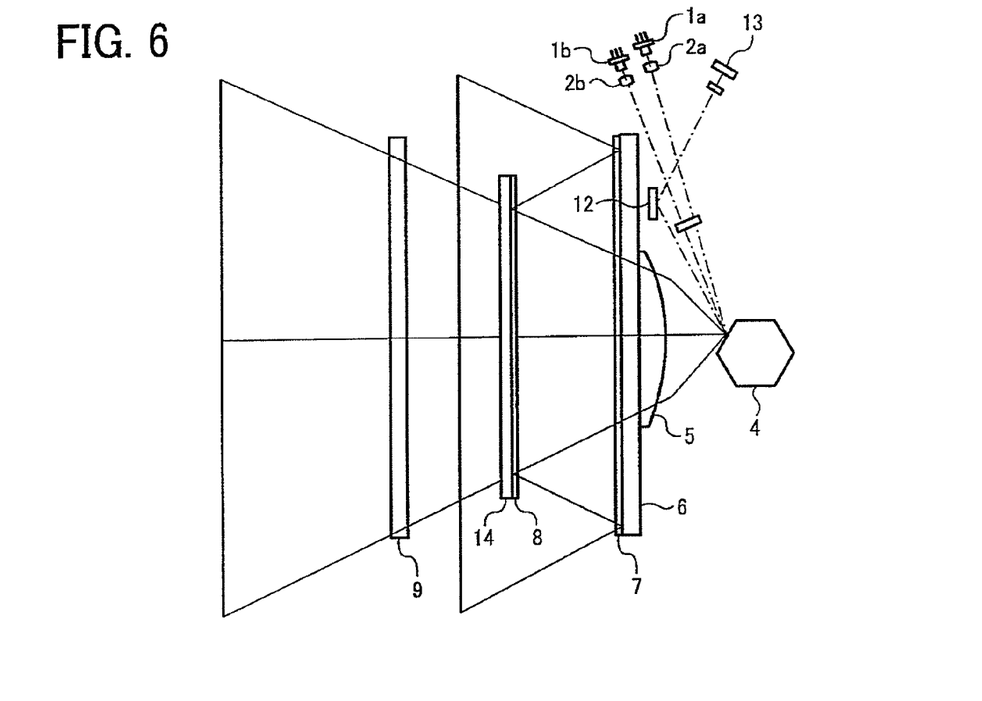
FIG. 6 is a plan view partially illustrating the exemplary optical writing device of FIG. 5.

Now, a second embodiment of the optical writing device 20 is described with reference to FIGS. 5 and 6. As shown, since plural structural elements are substantially symmetrically arranged on both sides of the polygon mirror 4, only the left side thereof is illustrated in FIG. 6.

Specifically, a lens 14 serving as a second imaging device is integral with a dichroic mirror 8. Specifically, a dichroic function is provided on a light entrance surface of the lens 14. The remaining construction is as the same as the optical writing device 10 of the first embodiment.

Figure 7A:
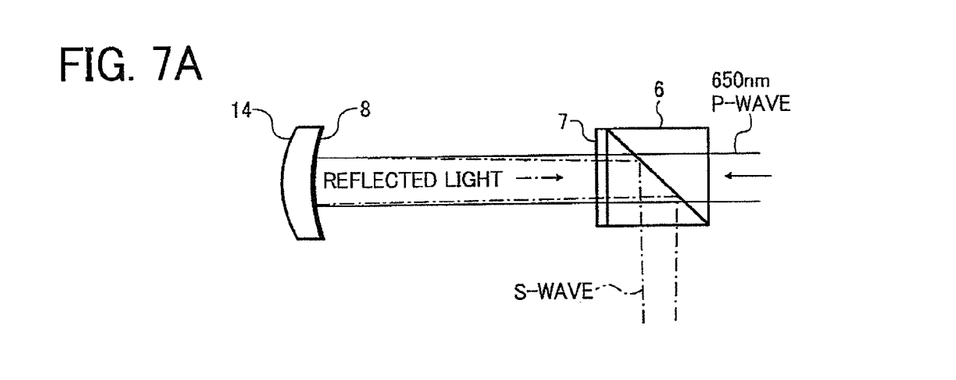
FIGS. 7A and 7B are models collectively illustrating an exemplary operation executed in the second embodiment.
Figure 7B:
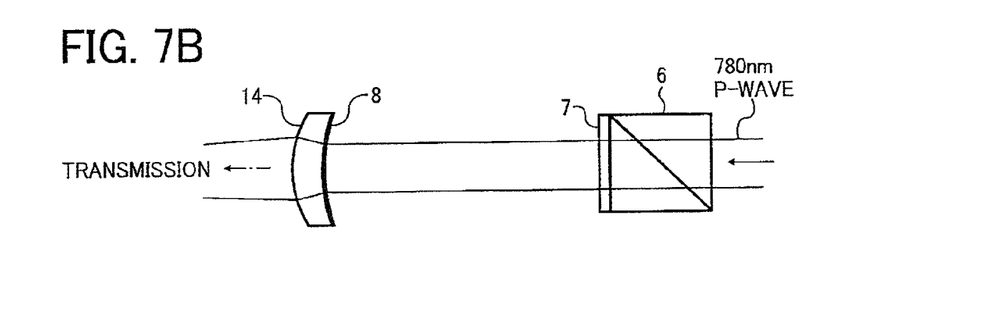

In the optical writing device 20 with the above-mentioned construction of the second embodiment, one of the two light beams directing to the photoconductive members is reflected by the lens 14 at its light entrance surface. To narrow the thus reflected light beam in the sub scanning direction, the light entrance surface of the lens 14 needs to form a concave mirror shape in the sub scanning direction. As shown in FIG. 7, the light beam reflected by the lens 14 at its light entrance surface is narrowed in the sub scanning direction and its polarization direction is then rotated by the angle of 45 degree (π/4) again when passing through the quarter wavelength plate 7 again. Specifically, the light beam is emitted to the photoconductive member 101b in a S-wave state of a straight-line polarization light.

The light beam passing through the lens 14 (e.g. the dichroic mirror 8) and directing to the photoconductive member 101a is expanded at the entrance surface of the lens 14 and is thus needed to be narrowed at the ejection surface, the ejection surface need to be a convex shape, and accordingly, the shape of the lens 14 is meniscus. The lens 14 is sometimes differently named in accordance with a function and a shape as described below.

A meniscus lens represents a lens having curvatures in the same directions on the light entrance and ejection surfaces. In the second embodiment, by employing the meniscus shape in the lens 14, it functions as a concave mirror to narrow the light beam by reflecting those by the first surface (i.e., an entrance surface) in the sub scanning direction. Further, even thought the light entrance surface is concaved and thus tends to expand the light beam passing through the lens 14, the light ejection surface narrows the same. When respective power of the light entrance and ejection surfaces are Alpha (α) and Beta (β), a reflection light is narrowed by the power minus alpha (−α) and a transmission light is narrowed by the power minus Alpha plus Beta (−α+β). Accordingly, when the below described relation is established, both of the reflection and transmission lights can be narrowed to have the same beam diameter.

$$\beta = 2 \cdot \alpha$$

An anamorphic lens represents a lens having a different focal length and a magnification at directions perpendicular to a beam advancing direction. Accordingly, when the lens 14 corrects a magnification error in the main scanning direction and adjusts a beam diameter in the main scanning direction or the like, the lens is called the anamorphic lens. Further, when the lens surface is shaped into arches both in the main and sub scanning directions, the lens is called a toroidal lens. In this embodiment, since lights with a different wavelength pass through the f-theta lens 5 as the first imaging device, errors necessarily occur in the main scanning magnification and the main scanning beam diameter or the like. Thus, the anamorphic (or the toroidal) lens is necessarily employed to correct such errors. In this embodiment, since being very small, the shape correcting a performance in the main scanning direction is typically illustrated by a straight line.

Thus, one of the both lens can be used for the lens 14 upon need in the second embodiment. Further, by making the lens of glass while forming a dielectric multi coat on a beam entrance surface thereon, a change of a temperature performance can be reduced. Otherwise, by making the lens 14 of transparency resin with an electro static multi coat thereon, a cost can be suppressed. Further, one and both of the scanning lens 5 and the lens 14 can employ the above-mentioned lens. Further, one or both of the scanning lens 5 and the lens 14 can include a diffractive lens.

In this way, by using two scanning lenses (i.e., the lenses 5 and 14) for one scan objective, the beam diameter can be decreased so that a high quality image can be obtained. At this moment, by providing a function to the first imaging device 5 arranged nearest to the polygon mirror 4 to correct a f-theta (fθ) performance and an imaging surface curvature and to narrow a beam in the main scanning direction, while using the second imaging device 5 arranged far from the polygon mirror 4 as a lens power to narrow the beam mainly in the sub scanning direction, the beam diameter can also be decreased. Further, the beam diameter is can be decreased by correcting magnification error and adjusting a beam diameter in the main scanning direction beside the function of narrowing the beam diameter in the sub scanning direction.

It is desired that two beams passing through the f-theta lens 5 efficiently pass through the polarization beam splitter 6. However, owing to unevenness of a light emitting condition from a light source or the light source itself, it is unsure that a light beam perfectly enters the polarization beam splitter 6 at the angle of 90 degree or in parallel thereto. A light slightly displaced in a polarization direction is separated by the polarization beam splitter 6, and is emitted in an opposite direction to the photoconductive member 101. Such a light advances in the opposite direction to the photoconductive member 101 and is reflected by the casing or the like and reversely advances again along the light path. As a result, a flare light is created and possibly has an ill influence on the other photoconductive member.

Figure 8A:
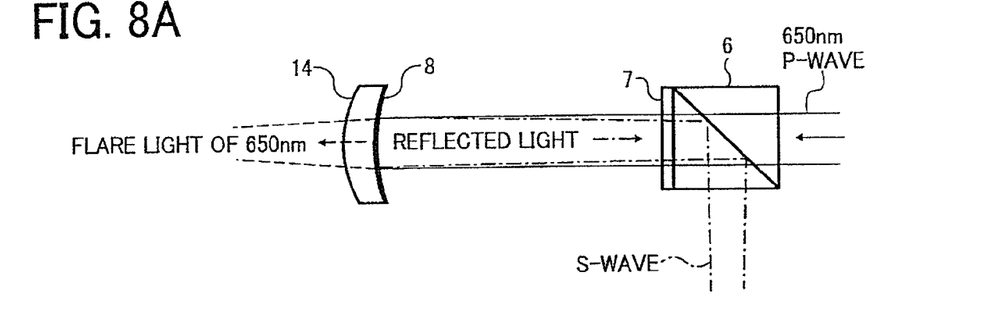
FIGS. 8A and 8B are also models collectively illustrating an exemplary flare light generation and an exemplary prevention device according to one embodiment of the present invention.
Figure 9A:
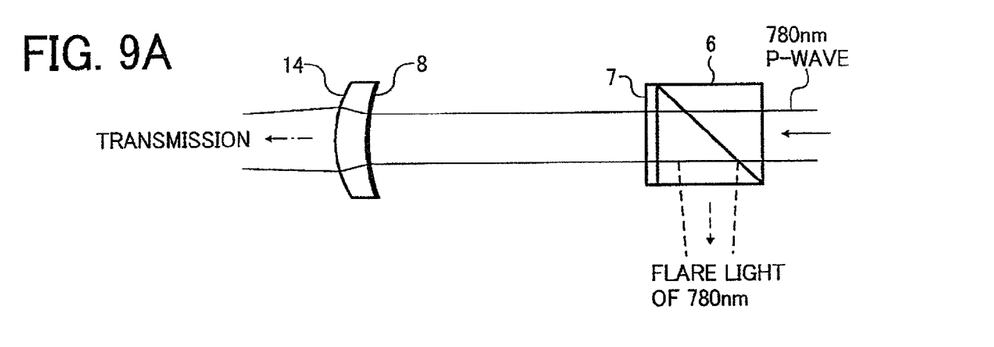
FIGS. 9A and 9B are also models collectively illustrating another exemplary flare light generation and an exemplary prevention device according to another embodiment of the present invention.

Specifically, as shown in FIG. 8A, the flare light of 650 nm proceeds to the photoconductive member 101*a* passing through the lens 14. As shown in FIG. 9A, the flare light of 780 nm proceeds downward from the polarization beam splitter 6 to the photoconductive member 101*b*.

Figure 8B:
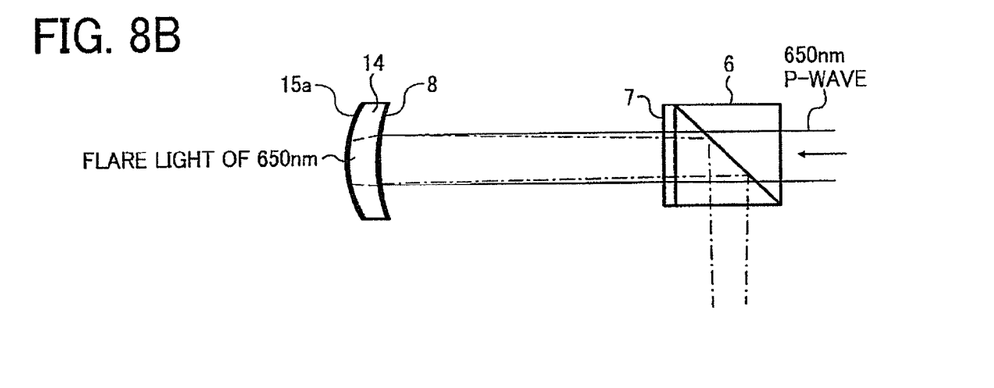
Figure 9B:
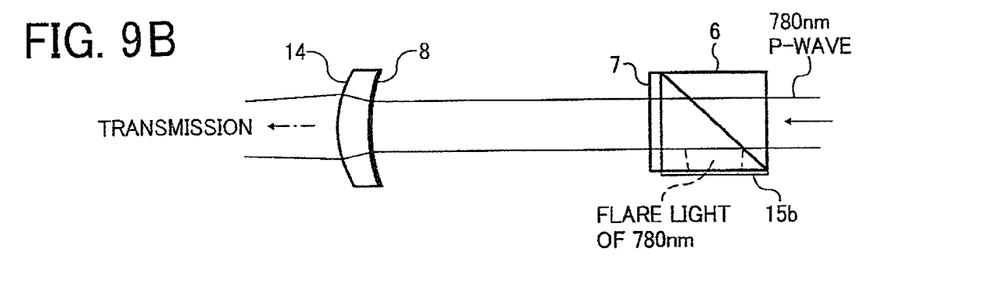

Then, as shown in FIGS. 8B and 9B, by arranging optical filters 15A or 15B on either the light emission surface of the lens 14 or the surface of the polarization beam splitter opposing the photoconductive member to attenuate the flare light beams having such wavelengths, the flare light can be prevented and accordingly a high quality image can be obtained. The above-mentioned two beams typically have wavelengths of 650 nm and 780 nm, respectively.

Further, since these two light beams separated have different wavelengths from the other, diameters of the respective light beams are different each other on the scan receiving surface of the photoconductive member when light paths up to photoconductive members as scan objectives are the same as mentioned above. Then, by arranging apertures having different shapes in accordance with the wavelengths of the respective light beams downstream of the collimate lens 2 of FIGS. 2 and 6, the diameters of the respective light beams can be equalized on the scan-receiving surface of the photoconductive member. As specifically illustrated in FIG. 10, the laser diode 1 and the collimate lens 2 are arranged in a lens holder 16, and a light beam emitted from the laser diode 1 passes through the collimate lens 2 and the diameter thereof is then adjusted by the aperture 17.

Figure 11:
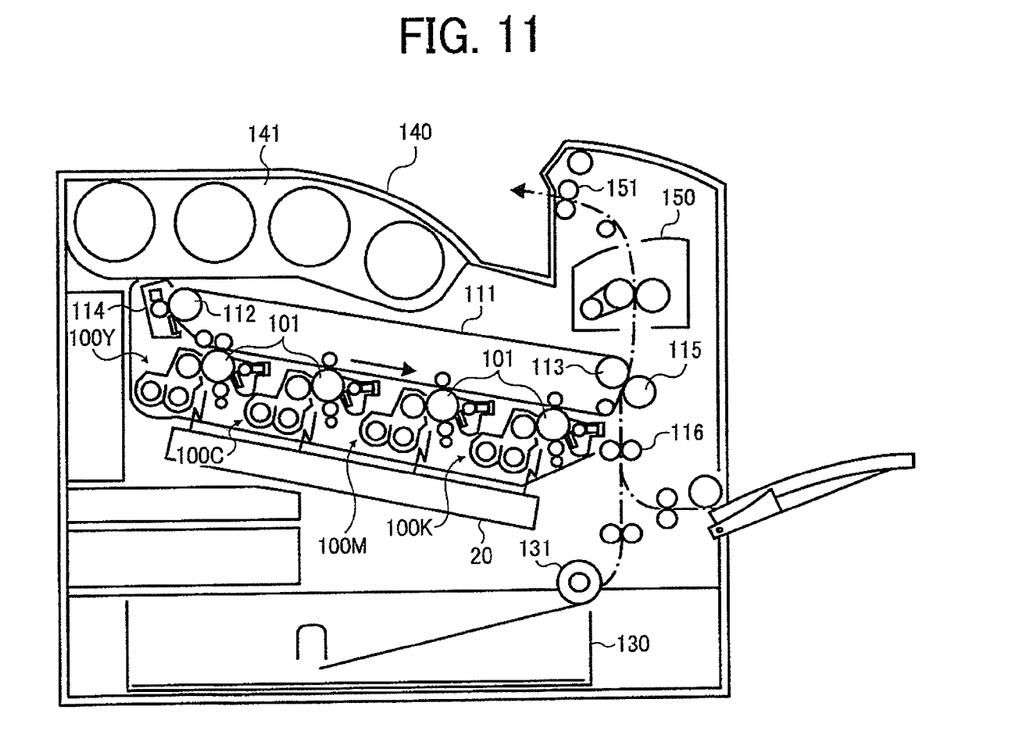
FIG. 11 is across sectional view illustrating an exemplary image forming apparatus including the optical writing device according to one embodiment of the present invention.

Now, an exemplary image forming apparatus with the above-mentioned optical writing device is described with reference to FIG. 11. As shown, the image forming apparatus employs a tandem system including plural image formation units 100Y to 100Bk substantially at the center thereof as a color printer so that a full color image can be formed. The respective image formation units 100Y to 100Bk for yellow to black colors are arranged beside an intermediate transfer belt 111 along the lower running side thereof. An intermediate transfer belt 111 is wound and driven counter clockwise by a pair of supporting rollers 112 and 113 or the like. On the outer side of the left side-supporting roller 112, a belt-cleaning unit 114 is arranged to clean the intermediate transfer belt 111.

The structure of each of the respective image formation units 100 is the same and only color of toner handled by the respective image formation units 100 is different from the other. That is, the respective image formation units 100 include photoconductive member drums 101 as an image bearer. Around the photoconductive member drum 101, a charge device, a developing device, and a cleaning device and the like are arranged. Also arranged inside the intermediate transfer belt 111 is a transfer roller as a primary transfer device.

Below the four image formation units 100, an optical writing device 20 is provided. The optical writing device 20 is handled by a full color image forming apparatus using four colors. The optical writing device 10 mentioned earlier in the first embodiment can be utilized. Although the photoconductive member 101 is arranged below the optical writing device 20 in the earlier mentioned embodiment, the photoconductive member 101 can be arranged above the optical writing device 20 in this embodiment to emit a light beam (a scan light) upwardly. In this optical writing device 20, a laser light optically modulated in accordance with image information is emitted to the surface of the photoconductive members 101 of the respective image formation units.

A toner containing section 141 is arranged above the intermediate transfer belt 111 and includes toner bottles storing yellow to black color toners, respectively. A toner supplying mechanism is provided in each of the respective toner bottles and supplies color toner to an applicable developing device arranged in each of the image formation units 100.

In the lower part of the apparatus, a sheet-feeding tray 130 is arranged to stack sheets. A sheet-feeding device 131 is also arranged to feed the sheets from the sheet-feeding tray 130. A sheet separation mechanism (not shown) and the like are provided.

A secondary transfer roller 115 is arranged opposing the supporting roller 113 of the intermediate transfer belt 111. A pair of registration rollers 116 is arranged in the vicinity and upstream of a second transfer section from the secondary transfer roller 115. Further, a fixing device 150 is arranged above the secondary transfer section.

Now, an exemplary operation of image formation executed in a color printer with the above-mentioned construction is briefly described. A driving mechanism, not shown, drives the photoconductive member drum 101 of the image formation unit 100 clockwise. The surface of the photoconductive member drum 101 is then uniformly charged by the charge device to have a prescribed polarity. The surface of the photoconductive member then receives a laser light from the optical writing device 20, so that a latent image is formed thereon. Image information included in the exposure light to the photoconductive member drum 101 includes mono color image by the charge device of yellow to black colors separated from a full color image. Then, respective color toners are applied to the latent images from the developing device, thereby visualizing the latent image.

Further, the intermediate transfer belt 111 is driven counterclockwise as shown and receives superimposition of the respective toner images from the photoconductive member drum 101 in the respective image formation units 100 by operations of the primary transfer rollers one after another. In this way, a full color toner image is carried on the surface of the intermediate transfer belt 111.

Further, a monochrome, dual color, triple color images can be formed using at least one of those image formation units 100. When the monochrome printing is executed, the right most black color unit is utilized among the four image formation units 100.

Then, the cleaning device removes the toner remaining on the surface of the photoconductive member drum after the toner image transfer process therefrom. Then, the surface is initialized by an operation of a charge remover thereby becoming a standby state for the next image formation.

Further, a sheet is fed from the sheet-feeding tray 130 to the pair of registration rollers 116. The pair of registration rollers 116 times and launches the sheet toward the secondary transfer position in synchronism with the toner image carried on the intermediate transfer belt 111. A prescribed transfer voltage is applied to the secondary transfer roller 115, so that the toner image on the intermediate transfer belt is transferred onto the sheet at once. The toner image transferred onto the sheet is fused thereinto by heat and pressure when passing through the fixing device 150. The sheet having completed the fixing process is then ejected by a sheet ejection roller 151 onto a sheet ejection tray 140 arranged on the apparatus body.

Since the optical writing device 20 is thin as mentioned earlier, it can be arranged within a limited inner space of the image forming apparatus, thereby capable of significantly downsizing the color image forming apparatus.

As the above-mentioned light source and secondary beam separation device, a prescribed combination thereof can be appropriately employed as far as they can separate plural light beams. Various devices can also be employed as the first beam separation device. Further, an entrance angle of the light beam to the scanning objective can be appropriately set. The photoconductive member as a scanning objective is not limited to a drum type, and a belt type can be employed.

Instead of the intermediate transfer system, a direct transfer system can be employed.

The present invention can be applied to the other multi color toner image forming apparatus, such as a dual color toner image forming apparatus, etc. Various components can optionally be employed in the above-mentioned image forming apparatus.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An optical writing device including at least two optical elements for scanning at least two scan objectives, said optical writing device comprising:
    at least two light sources each configured to emit a light beam having a different wavelength from the other;
    a light deflection device configured to deflect the light beams from the at least two light sources after being combined on the same axis in a sub scanning direction;
    a first beam separation device arranged to receive the light beams and configured either to allow the light beams to enter and pass or to reflect the light beams in accordance with a direction of entrance of the light beams;
    a second beam separation device configured either to allow or to reflect the light beams having passed through the first beam separation device in accordance a wavelength thereof, said light beam passing through the second beam separation device scanning one of the at least two scan objectives, said light beam reflected by the second beam separation device being reflected by the first beam separation device and then scanning the other one of the at least two scan objectives; and
    a first imaging device configured to correct a f-theta (fθ) performance and a curvature of an imaging plane to enable the light beams to scan the at least two scan objectives at a constant speed, said first imaging device being integral with the first beam separation device.

2. The optical writing device as claimed in claim 1, wherein said first imaging device includes an optical performance of narrowing the light beam into a prescribed shape on the at least two scan objectives.

3. The optical writing device as claimed in claim 1, further comprising a second imaging device integral with the second beam separation device and configured to narrow the light beams in the sub scanning direction on the at least two scan objectives, wherein said first imaging device includes an optical performance of narrowing the light beams into a prescribed shape in a main scanning direction on the other one of the at least two scan objectives.

4. The optical writing device as claimed in claim 1, wherein said first imaging device is provided on a beam entrance surface of the first beam separation device.

5. The optical writing device as claimed in claim 4, wherein one of the first and second imaging devices includes an anamorphic lens.

6. The optical writing device as claimed in claim 4, wherein one of the first and second imaging devices includes a diffractive optical element.

7. The optical writing device as claimed in claim 3, wherein said second imaging device is made of transparency resin and includes a dielectric conductive multi layer on the beam entrance surface.

8. The optical writing device as claimed in claim 7, wherein, the optical elements other then the light deflecting device are substantially symmetrically arranged on both sides of the light deflecting device commonly used, and
    wherein said at least two light sources include four light sources for different mono colors and said at least two scan objectives include four scan objectives receiving four light beams emitted from the four light sources, respectively.

9. An image formation apparatus comprising:

an optical writing device as claimed in claim 8; and four mono color-developing devices configured to develop latent images formed by the optical writing device with different mono color toners.

10. The image formation apparatus as claimed in claim 9, further comprising a full color image formation device configured to form a full color image, wherein said four scan objectives are arranged in tandem.

* * * * *